Nov. 14, 1944.     G. STEVENS     2,362,779
TOOL
Filed Nov. 16, 1943
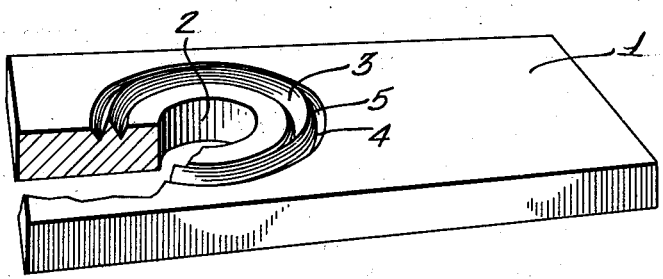
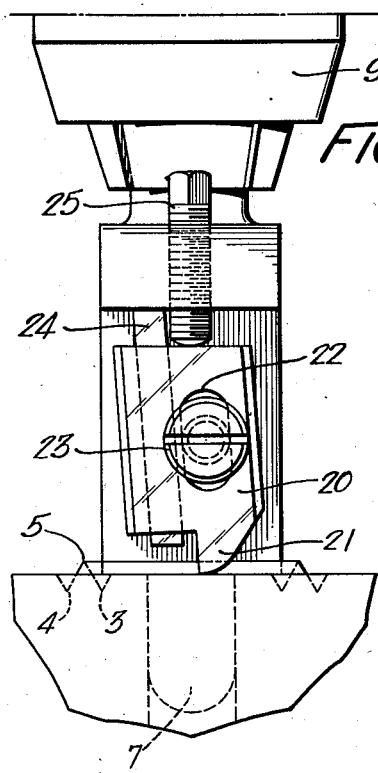
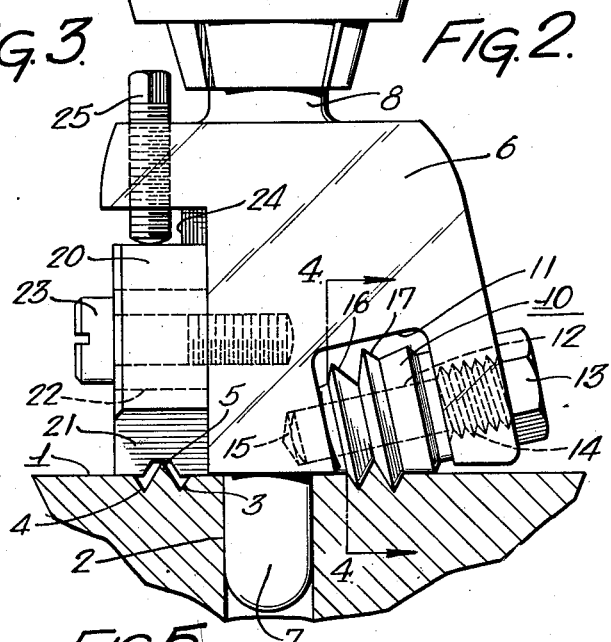
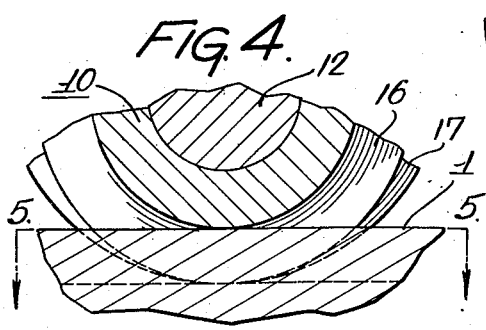
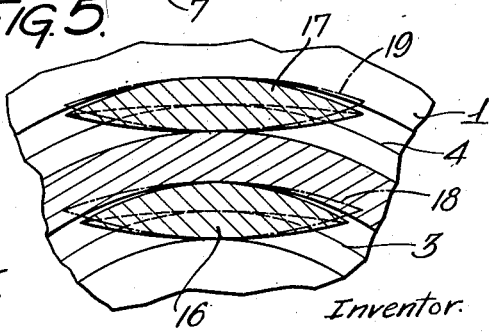
Inventor.
George Stevens Patented Nov. 14, 1944

2,362,779

UNITED STATES PATENT OFFICE 2,362,779

TOOL

George Stevens, Baltimore, Md.

Application November 16, 1943, Serial No. 510,529

5 Claims. (Cl. 80—3)

This invention relates to a novel tool for forming concentric grooves or recesses and raised ribs or projections on a work piece. More particularly the invention relates to a novel tool for forming a joint structure of the character disclosed and claimed in my copending application Serial No. 501,427 filed September 6, 1943. The said joint structure comprises a pair of members having complemental interfitting surface recesses and ribs by means of which the said members are interlocked against relative sliding movement in any direction. The tool provided by the present invention is adapted to form the said recesses and ribs in a simple and inexpensive manner and with a minimum of effort on the part of the operator.

The principal object of this invention, therefore, is to provide a novel tool for the stated purpose.

Another object of the invention is to provide a novel tool by means of which concentric recesses and ribs may be rolled or spun in a work piece simply by rotating the tool in operative engagement with the work piece.

A further object of the invention is to provide a novel tool having a rolling or spinning element arranged at an oblique angle to the axis of rotation of the tool, whereby the said element is enabled to form well-defined recesses and ribs in a work piece.

Other objects and features of the invention will become apparent as the description proceeds.

In the accompanying drawing,

Fig. 1 is a perspective view of a work piece after processing of the same by means of the novel tool provided by this invention, a portion of the piece being broken away to show the shape of grooves and rib formed therein;

Fig. 2 is an elevational view of the tool in operative relation with a work piece which is shown in section;

Fig. 3 is an elevational view of the tool from the left side of Fig. 2;

Fig. 4 is a fragmentary sectional view taken along line 4—4 of Fig. 2; and

Fig. 5 is a fragmentary sectional view taken along line 5—5 of Fig. 4.

Referring to Fig. 1 the piece or member 1 is intended to constitute one part of a joint in accordance with the teaching of my aforementioned application. This member has an opening 2 therethrough to accommodate a bolt or the like for holding the joined members together. By means of the tool of the present invention there are formed in member 1 surface recesses 3 and 4 and an intermediate raised rib 5, which are concentric with opening 2 and with one another. The tool forms the desired structure by forcing material out of the recessed areas into the rib area, thus forming the recesses and at the same time forming the projecting rib which is raised above the surface of the work piece.

Referring now to Figs. 2 and 3, the tool comprises a body 6 having a projecting pilot element or pin 7 for insertion in the opening 2 of the work piece 1. Opposite the pilot pin 7 and axially aligned therewith body 6 has a projecting portion 8 for insertion in the chuck 9 of a suitable rotating means such as a drill press. Thus the tool is adapted to be rotated about an axis which is constituted by the axis of pin 7 and the extension thereof through the body 6.

A rolling or spinning element 10, carried by body 6, has its axis of rotation disposed at an oblique angle to the axis of rotation of the tool. The tool body 6 is recessed, as at 11, to accommodate the element 10, which is rotatably mounted on an inclined axle 12. Preferably the axle 12 is constituted by a shank of a special screw 13 threadedly engaged with a portion of the tool body, as at 14. The end of the axle or shank 12 seats in a recess in the tool body, as at 15. By means of this structure the element 10 may be removed and replaced with another rolling element of different configuration, simply by removing the screw 13.

The axis of the rolling element 10, i. e.; the axis of axle 12, is preferably disposed at an angle of about 15° to the surface of the work piece, or stated differently at an angle of about 75° to the axis of rotation of the tool; but the oblique angular disposition of roller axis may be varied within the practical limits beyond which the roller will fail to operate as intended, of which more will be said later. The roller illustrated has two contiguous forming portions 16 and 17 of different peripheral diameters, each asymmetrically shaped, according to the angular disposition of axle 12, to form two symmetrical V-shaped recesses and an intermediate symmetrical V-shaped rib in the work piece as the tool is rotated. Preferably the forming portions of the roller are so constructed that the recesses and rib formed thereby have a 60° angular relationship between their respective sides.

It is to be understood, however, that the character of the roller may be varied to form recesses and ribs of different form. Moreover the specific roller shown is only one of two rollers which will be used to form the complete joint contemplated according to the aforementioned copending application. The complement of the recess and rib structure of joint member 1 will be formed in the other joint member (not shown) by replacing the roller 10 with another roller complemental in form to roller 10.

The oblique disposition of the roller axis and the construction of the rolling portions of the roller, as described above, constitute an important and essential feature of the invention as may be seen more clearly by reference to Figs. 4 and 5. If the roller axis were not tilted, i. e.; if it were substantially horizontal or at right angles to the axis of rotation of the tool, the roller could not function to form the desired recess and rib structure. This condition is depicted in Fig. 5 by the dot and dash outlines 18 and 19 which show how the forming portions of the roller would bite into the side walls of the recesses and mutilate the structure. By tilting the roller axis and by forming the rolling portions asymmetrically, the roller is prevented from engaging the work piece except at the areas of desired contact, as may be seen in Fig. 5. The angle of tilt of the roller axis may be varied but in any case it must be such as to avoid the biting action depicted in Fig. 5.

Furthermore the provision of different peripheral diameters on the forming portions of the roller compensates for the different angular velocities of the said portions about the tool axis, thus eliminating friction and consequent wear and strains in the roller.

Referring again to the tool structure, there is preferably provided a cutting member 20, opposite the roller, to remove any excess material which may be raised on the work piece. To this end the cutter 20 has a cutting portion 21 formed as illustrated. The cutter may be slotted, as at 22, to accommodate a screw 23 by which the cutter is removably secured to the tool body 6. The cutter is held against rotation by a pin 24, on the tool body, extending through a bore opening in the cutter body. An adjusting screw 25 serves to adjust the cutter, particularly to compensate for wear.

In operation the tool is rotated and pressure is applied axially thereto, and as the tool rotates the roller 10 forces the material out of the recess areas into the rib area, thus forming the recesses and the raised rib. Such of the material as is forced upward at the edges of the recesses is removed by the cutter 20. However the cutter is not essential, as such excess material could be removed by a grinding or polishing operation.

It will be apparent that the invention is not limited to the specific structure illustrated. Thus it is within the purview of the invention to provide a plurality of rollers arranged angularly about the tool, but for most purposes a single roller will suffice. Other modifications will occur to those skilled in the art.

I claim:

1. A tool for providing an annular recess and rib formation on a work piece, comprising a body, a pilot element on said body adapted to be inserted in an opening in said piece, whereby the tool may be rotated about an axis, and a roller rotatably carried by said body and having its axis disposed at an oblique angle to the axis of rotation of the tool, said roller being constructed and arranged to engage the work piece and form an annular recess and rib structure thereon as the tool is rotated.

2. A tool for providing an annular recess and rib formation on a work piece, comprising a body, a pilot element on said body adapted to be inserted in an opening in said piece, whereby the tool may be rotated about an axis, an axle carried by said body and having its axis disposed at an angle of approximately 75° with respect to the axis of rotation of the tool, and a roller rotatably carried by said axle to engage the work piece when the tool is rotated, said roller having asymmetrically shaped forming portions of different diameters for forming an annular recess and rib structure on the work piece.

3. A tool for providing an annular recess and rib formation on a work piece, comprising a body, a pilot element on said body adapted to be inserted in an opening in said piece, whereby the tool may be rotated about an axis, a roller rotatably carried by said body and having its axis disposed at an oblique angle to the axis of rotation of the tool, said roller being constructed and arranged to engage the work piece and form an annular recess and rib structure thereon as the tool is rotated, and a cutting member carried by said body and arranged to remove any excess material raised on the work piece by said roller.

4. A tool of the character described, comprising a body, a pilot element carried by said body and adapted for insertion in an aperture of a work piece to be operated upon, the axis of said pilot element forming part of the axis of rotation of the tool, a spindle or axle carried by said body and having its axis disposed at an oblique angle with respect to the axis of rotation of the tool, a roller rotatably mounted on said spindle and constructed to form at least one annular recess and adjacent annular rib on said work piece when the tool is rotated, and means on said body to enable rotation of the tool, said roller by reason of the disposition of said spindle being tilted inwardly toward the axis of rotation of the tool, whereby the roller is enabled to perform its aforesaid function.

5. A tool for providing an annular recess and rib formation on a work piece, comprising a body, a pilot element on said body adapted to be inserted in an opening in said piece, whereby the tool may be rotated about an axis, and a roller rotatably carried by said body and having its axis disposed at an oblique angle to the axis of rotation of the tool, said roller having asymmetrically shaped forming portions of different diameters for forming an annular recess and rib structure on the work piece.

GEORGE STEVENS.